United States Patent [19]

Jahr

[11] Patent Number: 5,199,747
[45] Date of Patent: Apr. 6, 1993

[54] CONNECTOR ASSEMBLY FOR DOUBLE WALLED TUBING

[76] Inventor: Willi E. Jahr, 22 Springdale St., Markham, Ontario, Canada, L3P 2A9

[21] Appl. No.: 701,040

[22] Filed: May 16, 1991

[51] Int. Cl.⁵ .............................................. F16L 39/00
[52] U.S. Cl. .................................... 285/47; 285/330; 285/424; 285/903; 138/DIG. 4
[58] Field of Search ................. 285/47, 330, 424, 903; 138/155, 149, 109, DIG. 4

[56] References Cited

U.S. PATENT DOCUMENTS

| | | | |
|---|---|---|---|
| 1,152,568 | 4/1912 | Stearns | 285/47 |
| 1,450,826 | 2/1922 | Walten | 285/424 |
| 2,180,649 | 6/1946 | Peck | 138/DIG. 4 |
| 2,894,537 | 9/1957 | Carr | 285/47 |
| 2,964,064 | 3/1957 | Jones | 285/47 |

Primary Examiner—Randolph A. Reese
Assistant Examiner—Timothy Aberle

[57] ABSTRACT

A connector assembly for connecting double walled insulated tubing uses connector members each having inner and outer walls engaging inner and outer walls of the tubing, and end walls which are configured to interengage and form a lapped joint, each outer wall and optionally each inner wall of each connector member being associated with a support ring so that each tubing wall is clamped between a connector wall and a support ring by blind rivets or other fastenings passed through the connector wall, the tubing wall and the support ring. The connector assembly can be either factory applied or applied in the field using available hand tools, yet provides a neat and reliable connection.

4 Claims, 1 Drawing Sheet

CONNECTOR ASSEMBLY FOR DOUBLE WALLED TUBING

BACKGROUND OF THE INVENTION

1. Field of the Invention

This invention relates to the connection of double walled insulated vent pipes or tubes, particularly, although not exclusively, flexible vent tubing.

2. Review of the Art

Particularly with the development of higher efficiency heating appliances, and in some other applications, there is a requirement for double walled insulated flue or vent pipes. Where prefabricated double walled rigid pipes are utilized, an installation must be assembled from available pipe lengths and connectors, which requires detailed advance planning, as well as layout compromises in many installations. For this reason the use of flexible double walled tubing, which can be bent to some degree and cut to length to suit a particular installation, is attractive. Unfortunately, it is not easy to form satisfactory connections between lengths of such tubing. Each wall of the tubing is typically of very thin metal which may be little more than 0.1 millimeters thick, and provides a wholly unsatisfactory anchorage for the metal screws or rivets commonly utilized for securing pipe in conventional couplings.

SUMMARY OF THE INVENTION

The present invention seeks to provide a connection system which may be applied to the ends of flexible double walled insulated vent pipes or tubing either in the factory or in the field, and which can provide couplings of high integrity between lengths of such tubing, or between such tubing and a rigid double walled pipe.

Accordingly, the invention provides a connector assembly for establishing connection between ends of lengths of double walled thermally insulated tubing having thin metallic inner and outer walls spaced by insulation, the assembly comprising: first and second complementary interengageable coupling members, each coupling member comprising concentric spaced inner and outer cylindrical walls, and a wall connecting the inner and outer walls, the connecting wall of a first coupling member being configured to mate with the connecting wall of a second coupling member, so as to form a lapped joint with their inner and outer walls of the coupling members respectively forming a substantially continuous surface; outer support rings associated with each coupling member and respectively of slightly different diameters from the diameters of the outer walls of the coupling members, the respective outer support rings and outer walls of the coupling members being dimensioned to receive between them the ends of the outer walls of a length of tubing to which each coupling is applied; plural outer fastening means passing through each of the outer walls of each coupling member and its associated support ring to clamp the outer wall of a length of tubing to which the coupling member is applied between the outer wall of the coupling member and its associated outer support ring; and inner fastening means securing inner wall of at least one of the coupling members to the inner wall of the pipe; the coupling members and support rings being of substantially thicker and more rigid metal than that of the tubing to which the assembly is to be applied.

To provide additional security, the inner wall of each coupling member may be associated with an inner support ring of slightly different diameter, the inner wall of a length of tubing to which the coupling member is applied being clamped between the inner wall of the coupling and the inner support ring by plural inner fastening means.

By using such an assembly, a sound, neat and effective connection can be effected either in a factory or on site using available hand tools, between lengths of double walled tubing, and at the same time, a secure connection can be achieved between the coupling member and the tubing walls, which are clamped and supported between the relatively more rigid walls of the coupling member and the support rings.

Further features of the invention will become apparent from the following description of a preferred embodiment of the invention.

SHORT DESCRIPTION OF THE DRAWINGS

In the drawings;

FIG. 1 is a perspective view showing connecting members on the ends of two lengths of double walled tubing to be connected; and FIG. 2 is a longitudinal fragmentary cross-section through an assembled connection between two lengths of tubing.

DESCRIPTION OF THE PREFERRED EMBODIMENT

Figures 1, 2:
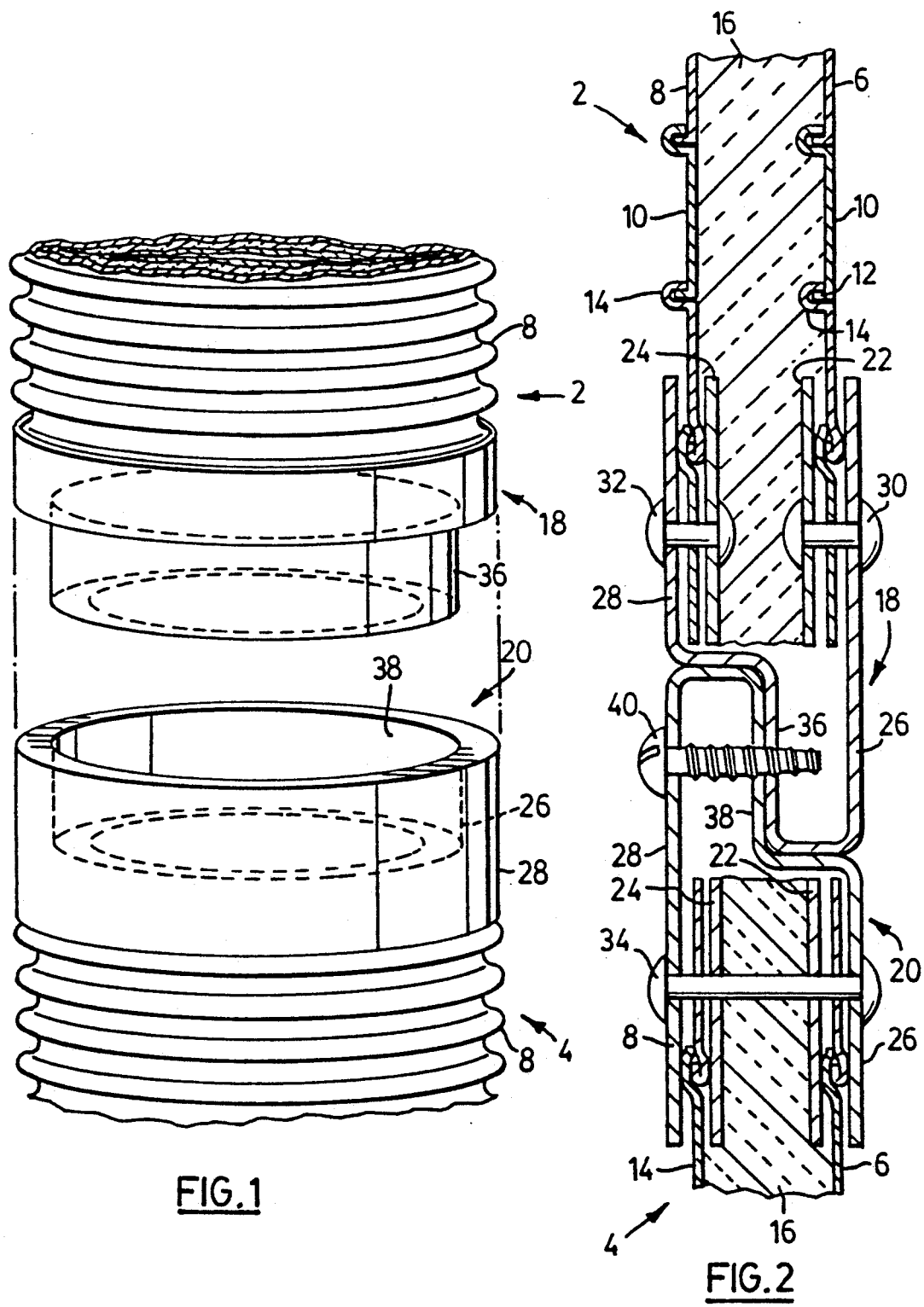

The connector assembly of the invention enables lengths of flexible tubing (such as that commonly known as B-vent), having metallic inner and outer walls spaced by insulation, to be prepared for incorporation into tube systems and for connection to other tubing elements. Although such tubing is known and used, joints between two lengths of such tubing, or such tubing and other tube fittings, have presented difficulty since the metallic walls of the tubing are very thin, typically no more than 0.005 inch or 0.125 mm, and provide inadequate retention of conventional fasteners such as metal screws or rivets. Moreover, not only is it difficult to form joints which are mechanically sound, but it is also difficult to form such joints so as to avoid unwanted seepage of creosote or condensed moisture, and so as to avoid unwanted constriction or irregularity of the inside wall of the tube. The present invention provides a connector assembly which can overcome these problems and is readily applied as required either during preassembly or at a job site without requiring the use of special tools.

Exemplary joints between two lengths of double walled tubing 2 and 4 and incorporating the invention are shown in the accompanying drawings. The tubing itself, shown schematically in FIG. 1, has inner and outer walls 6 and 8 formed from thin metal such as aluminum or stainless steel, depending on the application. In order to provide these walls with a degree of flexibility, they may be formed with corrugations as shown in FIG. 1, or more preferably are spiral wound in conventional spiral armor fashion as shown in FIG. 2 from thin metallic strip 10; the strip is formed at its respective longitudinal edges with an outwardly projecting flange 12 and an outwardly directed inwardly facing channel 14 which receives the flange of the strip in the adjacent turn of the spiral. The inner and outer walls are separated by a layer of insulation 16, typically of mineral fibre, although other forms of insulation or even simple air space may be utilized. In view of the out-turned location of the tongue and flange, the tubing of FIG. 2 presents a relatively smooth inner surface which it is desirable to maintain as far as possible through any joint, although this is obviously not possible if corrugated tubing is used for the inner wall.

The coupling assembly includes two mating connector components 18 and 20, preferably deep-drawn from metal compatible with that of the ducting, but of substantially greater thickness and rigidity. Typically the component will be drawn from a deep-drawable aluminum or stainless steel of between 0.03 and 0.05 inches (0.75 to 1.25 mm) thickness, resulting in inner and outer walls 26 and 28 of about half this thickness, but nevertheless substantially thicker and more rigid than the pipe. The assembly also includes, for each connector component, inner and outer metal support rings 22 and 24, which are sized so that they can be pressed by hand into the end of a length of tubing between the inner and outer walls respectively and the insulation. These rings may typically have a thickness of 0.012 to 0.016 inches (0.3 to 0.4 mm). After insertion of the rings, a connector component 18 or 20 is pushed onto the end of the tubing so that its inner and outer walls 26 and 28 closely surround the inner and outer surfaces of the ends of walls 6 and 8 respectively, concentric with the rings 22 and 24. The assembly is then drilled through the wall 28, the wall 8, the ring 24, the ring 22, the wall 6 and the wall 26, to receive fastenings which may typically be rivets. These may be short rivets 30 and 32 inserted from both inside and outside the connector component as shown in the upper part of FIG. 2, this being a preferred arrangement, or a single long rivet 34 inserted from outside the connector component, as shown in the lower part of FIG. 2. The latter arrangement may be necessary when the inside diameter of the tube is insufficient to admit a riveting tool: the rivet in this case be selected so that it can be applied without crushing the coupling. The peripheral distribution of the rivets will depend upon the degree of security required: usually they will be required at no more than approximately 120° intervals. Instead of rivets, conventional metal screws may be utilized.

In some cases, particularly when stainless steel tubing is utilized, it is possible to dispense with the inner support rings, and in this case it may also be desirable to apply fastenings between the inner wall of the tube and the inner wall of only one of the coupling members. Such an arrangement allows for differential expansion of the inner wall of the tube.

The end walls 36 and 38 of the connector components 18 and 20 have complementary step formations so that the connectors can form a lapped joint with their inner and outer walls 26 and 28 concentric. This joint once assembled can be secured by a metal screw or screws 40 or equivalent fastenings. Alternatively or additionally, the walls 36 and 39 may be formed on their steps with mating projections and grooves to form a bayonet or screw joint. The connectors should be applied so that the lap between them will be arranged to prevent leakage of creosote and condensate from the interior of the tubing through the joint to the exterior. The steps in the connector components also act as abutments to position them on the tubing ends.

The configuration and relative positioning of the connector components and support rings may be varied, provided that they cooperate both to clamp each of the inner and outer walls of the tubing between a connector wall and a support ring, and so as to provide a lapped joint between the connector components. Thus the relative positions of the rings and connector component could be reversed relative to the inside and/or outside walls, and in such a case the support ring could be extended to help form the lap of the connection. The connector components can also be utilized to provide means for coupling other pipe or tubing components to flexible tubing components. The component connector assembly according to the invention can of course be applied to opposite ends of a single length of flexible tubing to provide means for connecting it to adjacent tubing components.

I claim:

1. A connector assembly for establishing connection between ends of lengths of double walled thermally insulated tubing having thin metallic inner and outer cylindrical walls and insulation therebetween, the assembly comprising:

first and second complementary interengageable coupling members, each coupling member comprising concentric spaced inner and outer cylindrical walls, and a connecting wall extending both radially and longitudinally between the inner and outer walls, the connecting wall of the first coupling member and the connecting wall of the second coupling member having complementary mating configurations for forming a lapped joint with the connecting walls abutting and the inner and outer walls of the coupling members respectively forming substantially continuous inner and outer surfaces;

outer support rings associated with each coupling member and respectively of slightly different diameters from the diameters of the outer walls of the coupling members, the respective outer support rings and outer walls of the coupling members being dimensioned to receive between them the ends of the outer walls of a length of tubing to which the coupling member is applied;

plural outer fastening means passing through each of the outer wall of each coupling member, the outer wall of the associated length of tubing and the associated outer support ring to clamp the outer wall of the length of tubing to which the coupling member is applied between the outer wall of the coupling member and its associated outer support ring; and inner fastening means securing the inner wall of at least one of the coupling members to the inner wall of the tubing;

the coupling members and support rings being of substantially thicker and more rigid metal than that of the inner and outer walls of the tubing to which the assembly is to be applied.

2. A connector assembly according to claim 1, wherein the inner wall of each coupling member is associated with an inner support ring of slightly different diameter, the inner wall of a length of tubing to which the coupling member is applied being clamped between the inner wall of the coupling and the inner support ring by plural inner fastening means.

3. A connector assembly according to claim 1, wherein the end walls of the coupling members are of complementary stepped configurations, their inner and outer walls being sized to fit respectively inside and outside the walls of a length of tubing to which they are applied, the support rings being dimensioned so that they may be pressed during assembly between the tube walls and the insulation present between the inner and outer walls.

4. A length of double walled flexible tubing, to opposite ends of which are assembled the coupling elements and associated components of a connector assembly as claimed in claim 1.

* * * * *